Patented Jan. 17, 1933

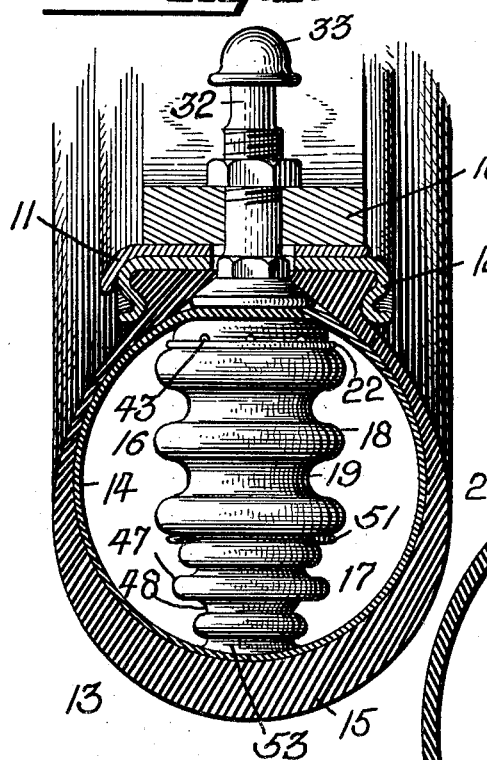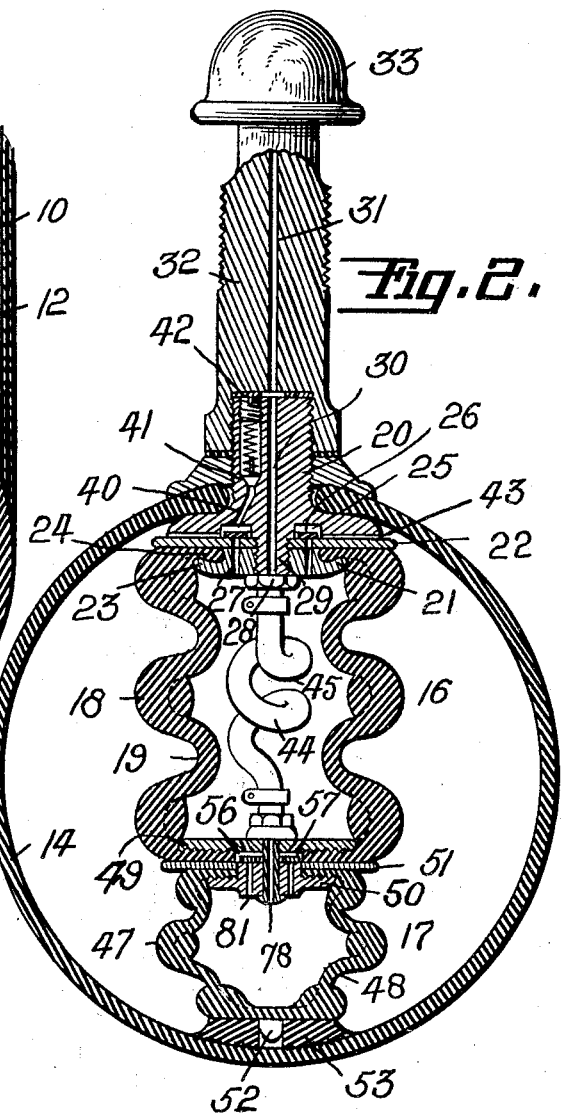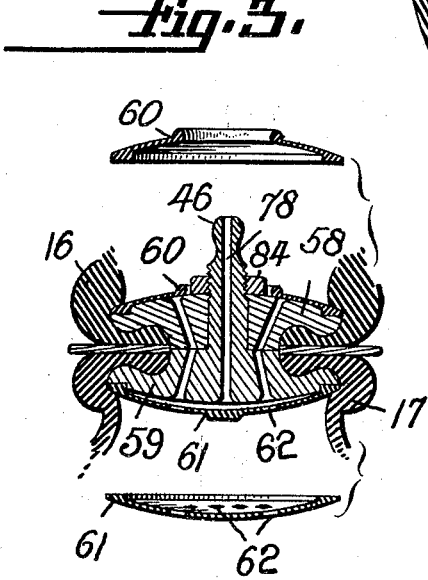

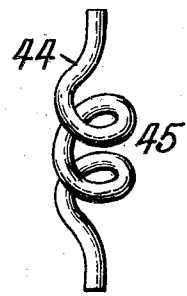
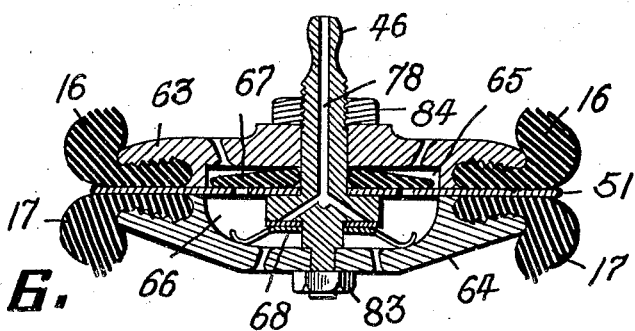
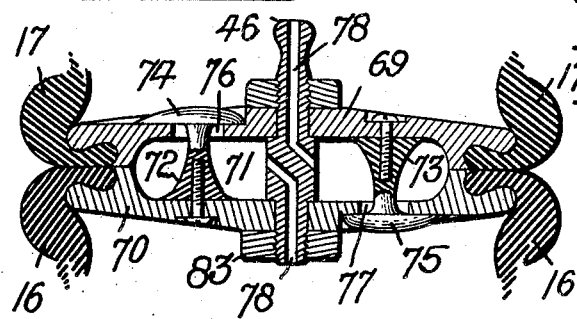
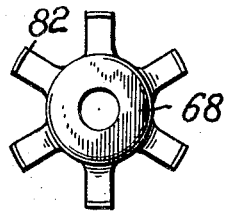
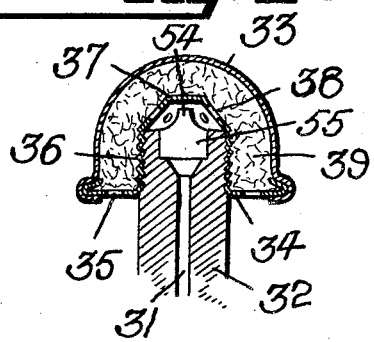
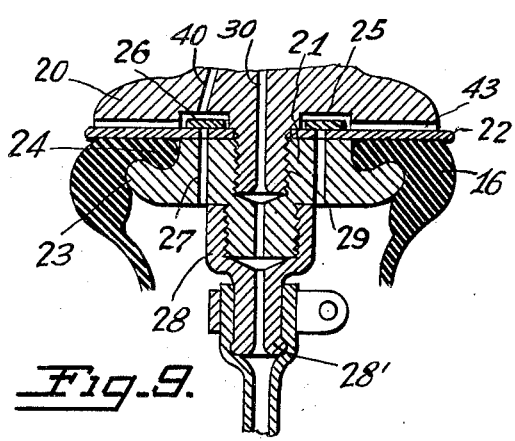

1,894,908

UNITED STATES PATENT OFFICE

EUGENE HOPKINS, OF GLEN COVE, NEW YORK

AUTOMATIC TIRE PUMP

Application filed September 15, 1930. Serial No. 481,947.

My invention relates to pneumatic tires, and more particularly to a pump and regulating device to be inserted within the ordinary automobile or other vehicle tire, to automatically inflate and retain the same at a constant pressure.

The object of the invention is to arrange an automatic air pump and an air pressure regulator that may be made separate from the inner tube, or it may be incorporated and made a part of the same, its construction and arrangement being such that the tire will automatically retain its resiliency.

Another object of my invention is to provide a device that is simple, durable, reliable and efficient in its action to keep the tire inflated. The unit may be applied to any inner tube by the ordinary vulcanizer, and is a device that may be readily accessible for purposes of inspection, repair, or replacement of parts or replacement as a whole, if necessary. Once the tire has been fully inflated, the device will be automatically actuated by the revolutions of the wheels to retain it in proper running order. The tire, with my device applied thereto, is self-regulating as to heat and cold, there being no chance of over-inflating or over-heating, either while standing or riding.

A more particular object is to provide a device that is adapted to be made as a separate unit, and applied to any pneumatic tire. Its simplicity and accuracy, together with the quickness that the device may be installed, commend it to the user in preference to all other tires now in the market. It saves time, care and attention, and prevents the annoyance of the tire being refilled from time to time.

The invention will be better understood from the following description, taken in connection with the accompanying drawings, wherein is shown what is now considered the preferred form, while the drawings illustrate merely some examples of means for putting my invention into practice; its scope will be pointed out in the specification and in the appended claims.

Further objects and advantages will become apparent as the description of the invention is hereinafter developed.

Fig. 1 is a transverse sectional view of a pneumatic tire, showing my invention applied thereto in elevation; Fig. 2 is an enlarged transverse sectional view of the inner tube and my bulb chambers showing my automatic pump and air pressure regulator in position therein; Fig. 3 is a modified form of air pressure regulator, showing the thin flexible discs thereon and detached; Fig. 4 is a view of the central tube used to inflate the high and low pressure bulb chambers; Fig. 5 is another modified form of air pressure regulator; Fig. 6 is still another modified form of the same, and Fig. 7 is a detached plan view of the spring disk for closing the valve openings shown in Fig. 5. Fig. 8 is an enlarged sectional view of the air inflow cap.

Referring to the drawings 10 shows the ordinary rim of an automobile or other vehicle, the same is provided with the ordinary metal rim 11 and the shoe clamping member 12. The pneumatic tire 13 comprises an inner tube 14 and an outer shoe or casing 15 enclosing the same.

Within the tire are two bulbs, one above the other, the outer one being the smaller of the two. Reference to these bulbs will be referred to as high and low pressure as a matter of convenience, relating only to their initial action as a pumping unit. The pump that is proposed to be inserted in the inner tube 14 comprises high and low pressure bulb chambers 16 and 17; the former is of relatively large size, and is made cylindrical in shape, provided with heavy circular ribs 18, and relatively thinner connecting wall sections 19. The high pressure bulb chamber 16 is composed of live pliable rubber and reinforced with fabric composition or other suitable material.

The upper end of the bulb chamber 16 is locked securely against slippage by means of the members 20 and 21, holding therebetween a fibre disc 22. The member 21 is provided with a holding finger 23 that holds the end 24 of the bulb chamber secure. The member 20 is provided with a suitable channel 25 which may house a suitable flat disc 26 of live rubber, or any one of the well-known varieties of flap valves known to the trade. The member 21 has channels 27, which connect the inner part of the high pressure bulb cylinder, with the valve channel 25. The above referred to members are all secured together by a nut 28.

The member 20 is provided with a tire holding disc 28, which presses on the fibre disc 22. Said member 20 has a threaded extension 29 provided with a central bore 30, which aligns with the bore 31 in the extension 32. The upper part of such extension is provided with a suitable hollow cap 33, the latter comprising a plate 34 having perforations 35 on its under side, and having a threaded member 36 extending upwardly with a beveled dome 37, the inclined sides of which are also provided with perforations 38. Interposed between the two walls of the cap is packed very tightly spongy substance or brass wool 39. The object is to prevent water from penetrating the protection cap. This may be accomplished by packing sponge therein or brass wool treated with oil, which would prevent any substantial amount of moisture from flowing past, without excluding passage of air under suction force. The air from the outside atmosphere is drawn through the protective cap on valve stem 32, which cap is filled with spongy substance acting both as an air filter and a means of escape of excess air pressure, and swelling with moisture to prevent water being drawn in with the air. Thus it will be seen that the construction and arrangement of this cap excludes dust and dirt, also dampness, from the interior of the device, yet permitting air to enter through the perforations 35, through the sponge or other suitable material 39 to the dome 37, and pass down the channel 31 to the interior of the low pressure bulb chamber 17. The member 20 has a second channel 40, having a valve 41 that may be regulated as to pressure by adjusting the internal nut 42. The channel 40, back of the valve 41, is in communication with the duct 31. The pressure of the valve 41 may be adjusted to any predetermined amount, and any pressure in the inner tube in excess of this amount will be vented or relieved through the channel 40, and past the valve 41 to the exterior. On the under side of said member 20 are a plurality of radial passages or ports 43, extending from the chamber 25 to the inner tube 14.

The free end of the member 20 is provided with a nozzle (not shown) to which a tube 44 may be made secure by any suitable clamp. Said tube is of flexible material and may be made preferably with the curved sections 45 therein, or the tube may be of a straight tubing, then twisted to provide length within the bulb 16. The lower end of said tube 44 is suitably connected to the lower nozzle 46 secured to the lower valve connecting member to be now explained.

To the lower end of the high pressure bulb chamber 16 is secured a low pressure bulb chamber 17 of relatively smaller size, also provided with heavy horizontal ribs 47 with thinner connecting wall sections 48; such low pressure cylindrical bulb chamber is composed of live rubber and fabric composition or other similar flexible material, as has been explained in connection with the high pressure bulb 16. The lower end of the high pressure bulb chamber, and the upper end of the low pressure bulb chamber, are held securely together by members 49 and 50, each of the respective ends of the bulbs are locked together with a fibre disc 51 interposed therebetween. A valve outlet device is constructed between the high and low pressure connection of the two cylinders, and may be composed of metal or of wood fibre as will be described further on. The valve inlet may be constructed in any of a plurality of ways, the most important of which is herewith illustrated in Figs. 2, 3, 5 and 6. The under surfaces of members 49 and 50 may be serrated on their inner sides so as to hold secure the respective ends of the two bulb chambers 16 and 17. The lower end of the bulb chamber 17 is provided with a suitable projection 52, which fits within a suitable ferrule 53, which is secured within the inner tube 14. Both the high and low pressure chambers 16 and 17 are molded in the design shown so that each bulb chamber will, when in operation within the tire, operate on the accordian principle. Each cylinder being a hollow elastic body composed of relative movable or expansible and collapsible walls, is adapted to be expanded and contracted on their length only by the deflection of the tire upon the revolutions of the wheel to pump in atmospheric air, and force the same first from the low pressure bulb chamber 17, into the high pressure bulb chamber 16, and then from the high pressure chamber into the air containing inner tube 14 of the tire. By the constant deflection by the revolutions of the vehicle wheel, the low pressure chamber 17 keeps adding pressure to the high pressure chamber 16. As the pressure in chamber or bulb 16 increases and becomes greater than the pressure in the tube, the air will pass into the valve chamber 25 and pass thence through passes 43 into the tube, and at the same time the large bulb 16 tends to elongate and squeeze down the relatively lighter walls of the small bulb 17. As pressure from the air pump or tank continues, air chamber 16 and also the inner tube both reach, for example, the standard pressure of forty pounds, but with the result that the larger bulb 16, with its heavier walls, has elongated and compressed the smaller bulb 17, so that it becomes inactive. The importance of the bulb construction is apparent from the fact that the ribbed walls prevent expansion of the bulbs except in one direction, namely, length. In its movement lengthwise, said bulb causes the low pressure chamber 17 to assume more and more a condition of collapse, and therefore it has opportunity to add only little or no pressure to the chamber 16, and then only when the wheel strikes a rut or some depression. Thus it will be seen that the high pressure bulb will expand and contract without in any way departing from its cylindrical form. As the bulb so extends and contracts by the pressure supplied, so also does the tube 44 extend and recede by reason of its circular twists, which in themselves form and act as does a spring, which causes it at all times to remain central of the chamber 16.

It may be preferable to inflate the tire or tires at a service station to a practical extent before starting out on a trip, but it is not at all necessary if the tires have only a small quantity of air therein, as the pump will commence to act and cause the air to be compressed within the tire to the desired extent. But to fill the tire by this means, it is only necessary to drive slowly until the tires have reached their maximum of inflation, after which no further attention is necessary; be it hot or cold weather, the device will automatically adjust itself.

But if refilling at the station, it is only necessary first, to remove the cap 33 and apply the valve stem (not shown) of the station supply against the projection 54 of a flat plate 55 inserted across the opening in the channel 31, which will permit the air to pass down through the tube 43 to the low pressure bulb chamber 17. The air then passes through channels 81 in the member 50, past the flat flexible disc 57, which is housed in channel 56, into the high pressure chamber 16. Then when this member is pumped up to the standard quantity, say 40 lbs., it will pass into the confines of the inner tube 14. When the tube 14 and the high pressure bulb chamber have attained the maximum, the cap 33 is returned to the top of the valve stem 32. Then as the vehicle passes over the road, the revolutions of the wheel cause the two bulbs 16 and 17 to cooperate in maintaining the proper quantity of air within the tire. The high pressure bulb 16 being now extended, and the low pressure bulb in a more or less collapsed, condition, as the wheel passes over the uneven places in the road the low pressure bulb chamber will cause a suction action on the tube 44 and cause air to enter the openings 35 in the cap, be filtered by the sponge, then pass through openings 38, and from there pass down the stem through the tube 44, to the low pressure bulb chamber 17, then through channels 81, past the flat flexible disc 57 into the high pressure chamber 16, after which it passes into the tire 14. When the inner tube 14 and the high pressure bulb 16 have attained their maximum pressure, the low pressure bulb 17 will not act until there exists a difference in pressures.

Referring now to Fig. 3, it will be seen that the clamping members 58 and 59 have secured to their outer sides flat flexible discs 60 and 61, as shown. As the air is forced down through the tube 44, the air forces the disc 61 from the lower face, and escapes into the low pressure bulb chamber 17, through openings 62 which are in alignment with channels which convey it to the high pressure bulb chamber 16, if the pressure in the high pressure bulb is such as to permit the flexible disc 60 to lift and the air to enter. This last mentioned disc may have reinforced ends, whereby it will at all times remain in closed position, only opening when the pressure in the upper bulb will permit.

In Fig. 5 is shown another form wherein the clamping members 63 and 64 clamp the respective ends of the upper and lower bulbs, each member having a suitable chamber 65 and 66 therein. In each case, it has been found preferable to have the fibre disc 51 interposed between the members to operate in connection with the flexible valves. The member 63 houses, as has been noted, any one of several well-known methods of flipping valve 67 that only moves as the pressure in one or the other bulb requires. The member 64 houses the terminal of the central air inlet 78, the openings of which may be closed by a suitable spring disc 68 which will hold a soft cushion up against the openings and keep them closed.

In Fig. 6 is shown another form, the clamping members 69 and 70 each being hollowed out so that when put together they form chamber 71. In this form the inlet nozzle discharges into the central chamber 71, and from said chamber into the lower bulb 17. Suitably secured to the inner sides of each of said clamping members may be provided flexible mushroom valves 72 and 73, each having its enlarged head 74 and 75 spreading over the opening 76 and 77, holding these respective openings in proper position until the pressure in one or the other requires the respective valve to function. As has been stated, these several valves comprise only a few of the many forms that have been used in the experiment.

After the air passes under pressure into high pressure bulb chamber 16, it continues under pressure elongating the high pressure bulb chamber 16, until it exceeds the air pressure in the air containing tube 14, as has been noted. As the high pressure bulb chamber 16 is elongated by the air pressure, it presses down on low pressure chamber 17, shortening the air pressure bulb cylinder 17, thereby reducing proportionately the action of low pressure bulb chamber 17, eventually compressing it to a point of complete collapse and entirely stopping its action.

When the air pressure in high pressure chamber 16 exceeds the air pressure contained in tube 14, the walls of the high pressure chamber 16 are straightened out, or become extended, or tend to become so; and under the high pressure, increased by the wheel in contact with the road under load pressure, the air is forced from the high pressure bulb chamber 16 through valve outlet 26, into the air containing inner tube 14.

While I have herein described the form of my invention as at present preferred and which I consider to represent the best embodiment thereof, yet I desire to have it understood that the various forms shown are only illustrative and that the invention may be carried out in other ways than that shown and described; for instance, the arrangement of the various valves may be of metal instead of rubber or other such flexible material, as shown, or the connecting members that hold the bulbs together and contain an inflow and an outflow valve, also the bulbs may be modified by regular accordian plaits for the compression and expansion exacted of them by the revolutions over the ground of the automobile or other wheel. Any of the forms may be used or any modification thereof to advantage, and they are all intended to come within the scope of the claims.

What I claim as new and desire to protect by Letters Patent is:

1. An automatic air pressure regulator for a pneumatic tire comprising, in combination, an air chamber, means in said chamber including a collapsible pumping unit for introducing air under pressure into said chamber, an auxiliary pressure-responsive unit for controlling the operation of said pumping unit by controlling the degree of collapse thereof, said pressure-responsive unit also being disposed within said chamber, and means for relieving excess pressure in said chamber.

2. In combination with the pneumatic tire tube of a vehicle wheel, a pair of intercommunicating hollow bulbs in said tube, one of said bulbs being adapted upon distortion of said tube due to continued rotation of the said wheel in contact with the ground or other support to force atmospheric air into the other bulb, the interior of said other bulb being in communication with the interior of said tube, said first-named bulb being operable only when the pressure in said other bulb falls below a predetermined amount.

3. Means for automatically inflating the inner tube of a pneumatic tire, comprising inner and outer cylindrical hollow accordion-like bulbs disposed in end-to-end relationship transversely of said tube, a conduit for introducing air from the atmosphere into said tube, said conduit opening to the atmosphere at one end thereof and into said outer bulb at the other end thereof, a valved passageway between said inner tube and inner bulb, and a valved passageway separate and distinct from said conduit and connecting said inner and outer bulbs.

4. In an automatic air pump and air pressure regulator for the inner tube of a pneumatic tire, compressible bulbs comprising inner and outer bulbs disposed in end-to-end relationship transversely of said tube, a valve adapted to control the transmission of air under pressure between said bulbs, a valve adapted to control the transmission of air under pressure between the inner bulb and the inner tube, a conduit for introducing air from the outside of the tire to said outer bulb, and a passage connecting the tube to said conduit and containing a spring-pressed valve adapted to permit relief of excessive air pressure within the tube through said conduit.

5. An automatic air pump and air pressure regulator adapted to be applied to any pneumatic inner tube, comprising inner and outer bulbs, a fiber plate interposed between the ends of said bulbs, plates having serrated faces for clamping and holding the bulbs together, means for controlling the passage of air under pressure from one to the other bulb, means for controlling the passage of air under pressure from the inner bulb to the inner tube, a conduit for admitting air to the outer bulb, and a valved by-pass between said conduit and the inner tube.

6. In combination with an air chamber containing inner and outer compressible members disposed transversely of said air chamber, said outer member constituting an intermittently operable pump, valved means for controlling passage of air under pressure from the pump to the inner member and from the inner member to the air chamber, and inlet means for air from the atmosphere into said pump.

7. An automatic air pump and air pressure regulator adapted to be securely retained in predetermined relationship to and within the inner tube of a pneumatic tire, comprising two substantially cylindrical bulbs of different sizes, said bulbs being interconnected and expansible and contractible without losing their cylindrical character, plates and clamps containing valves and securing said bulbs together, means for introducing filtered air into one of said bulbs, a valved passageway extending from the other of said bulbs to said tube, said bulbs being operated by distortion of the tire upon continued revolution, on the ground or other support, of the wheel upon which said tire is mounted; and means for relieving excessive pressure within said tube through the aforesaid means.

8. In combination with a pneumatic tire of a vehicle wheel, inner and outer intercommunicating bulbs disposed in said tire, said outer bulb being adapted upon distortion of said tire due to continued rotation of said wheel in contact with the ground or other support to force air into said inner bulb, said outer bulb being rendered inoperative when the pressure in said inner bulb reaches a predetermined amount.

9. An automatic air pump and air pressure regulator adapted to be applied to any inner pneumatic tube, comprising inner and outer bulbs, a fiber plate interposed between the bulbs, a clamping plate on each side of said fiber plate, said clamping plates being provided with alined passageways for the passage of air from one to the other of said bulbs, flexible disc valve means associated with said ducts, a conduit for admitting air to the outer bulb, and a valved by-pass between said conduit and the inner tube.

Signed at Glen Cove, in the county of Nassau and State of New York September A. D. 1930.

EUGENE HOPKINS.